US010323770B2

(12) United States Patent
Hunt

(10) Patent No.: US 10,323,770 B2
(45) Date of Patent: Jun. 18, 2019

(54) CONTROL MEMBER FOR A FLUID CONTROL DEVICE

(71) Applicant: EMERSON PROCESS MANAGEMENT REGULATOR TECHNOLOGIES, INC., McKinney, TX (US)

(72) Inventor: Christopher Joseph Jack Hunt, Redondo Beach, CA (US)

(73) Assignee: EMERSON PROCESS MANAGEMENT REGULATOR TECHNOLOGIES, INC., McKinney, TX (US)

(*) Notice: Subject to any disclaimer, the term of this patent is extended or adjusted under 35 U.S.C. 154(b) by 15 days.

(21) Appl. No.: 15/281,483

(22) Filed: Sep. 30, 2016

(65) Prior Publication Data

US 2017/0102091 A1    Apr. 13, 2017

Related U.S. Application Data

(60) Provisional application No. 62/240,377, filed on Oct. 12, 2015.

(51) Int. Cl.
*F16K 17/34*    (2006.01)
*F16K 31/50*    (2006.01)
(Continued)

(52) U.S. Cl.
CPC .............. *F16K 31/50* (2013.01); *B23P 19/00* (2013.01); *F16K 1/36* (2013.01); *F16K 1/487* (2013.01);
(Continued)

(58) Field of Classification Search
CPC ...... F16K 31/50; F16K 1/487; F16K 31/1226; F16K 1/36; B23P 19/00; G05D 16/0658
(Continued)

(56) References Cited

U.S. PATENT DOCUMENTS 2,017,739 A * 10/1935 Tomlinson .............. F16K 31/50
137/630.22
2,800,141 A *  7/1957 Hedland .............. G05D 7/0133
137/484.2
(Continued)

FOREIGN PATENT DOCUMENTS

CN        202884067 U    4/2013
EP         1114955 A2    7/2001
(Continued)

OTHER PUBLICATIONS

International Search Report and Written Opinion dated Jan. 3, 2017 in counterpart International Application No. PCT/US2016/056493.

*Primary Examiner* — Umashankar Venkatesan
(74) *Attorney, Agent, or Firm* — Marshall, Gerstein & Borun LLP

(57) ABSTRACT

A control member for use in a fluid control device is disclosed. The control member may include a through-bore for receiving a valve stem and one or more counter-bores aligned with the through-bore. One of the counter-bores may receive a connection member, such as a retaining nut, for connecting the control member to the valve stem. Accordingly, the connection member may be concealed within the control member and thus prevented from interfering with the fluid flow around the control member. Also disclosed is a fluid control device incorporating the control member and a method of assembling a fluid control device incorporating the control member.

10 Claims, 7 Drawing Sheets

(51) Int. Cl.
*B23P 19/00* (2006.01)
*F16K 31/126* (2006.01)
*F16K 1/36* (2006.01)
*F16K 1/48* (2006.01)
*G05D 16/06* (2006.01)

(52) U.S. Cl.
CPC ..... *F16K 31/1266* (2013.01); *G05D 16/0658* (2013.01); *G05D 16/0661* (2013.01); *Y10T 137/7754* (2015.04)

(58) Field of Classification Search
USPC ...................................................... 137/484.2
See application file for complete search history.

(56) References Cited

U.S. PATENT DOCUMENTS

| | | | |
|---|---|---|---|
| 2,911,994 A * | 11/1959 | Branson | F16K 31/1266 137/270 |
| 3,392,749 A | 7/1968 | Gneiding et al. | |
| 4,326,557 A * | 4/1982 | Behle | F16K 1/02 137/316 |
| 9,639,093 B2 * | 5/2017 | Morgan | G05D 16/0633 |
| 2009/0146096 A1 | 6/2009 | Davies, Jr. et al. | |
| 2012/0235069 A1 | 9/2012 | Richardson et al. | |
| 2015/0276078 A1 | 10/2015 | Xiao et al. | |
| 2015/0362070 A1 * | 12/2015 | Lei | F16K 1/36 92/82 |

FOREIGN PATENT DOCUMENTS

| | | |
|---|---|---|
| GB | 763134 A | 12/1956 |
| GB | 1184720 A | 3/1970 |

* cited by examiner

CONTROL MEMBER FOR A FLUID CONTROL DEVICE

CROSS-REFERENCE TO RELATED APPLICATION

The priority benefit of U.S. Provisional Application No. 62/240,377, filed Oct. 12, 2015, is claimed, and the entire contents thereof are expressly incorporated herein by reference for all purposes.

FIELD OF THE DISCLOSURE

The present disclosure generally relates to fluid control devices such as fluid regulators, and more particularly, to the configuration and assembly of a control member for a fluid control device.

BACKGROUND

Fluid control devices are used in variety of systems (e.g., natural gas delivery systems, chemical treatment systems, etc.) to control the flow of a fluid therethrough. Fluid control devices encompass various categories of equipment including control valves and regulators. In general, fluid control devices have a fluid flow path and a control member for adjusting a dimension of the fluid flow path.

FIG. 1 depicts a known regulator 10 including a valve body 12 and an actuator 14. The valve body 12 includes an inlet 13 and an outlet 16 with a flow path 18 extending therebetween. A portion of the flow path 18 is defined by a throat 20, and a valve seat ring 22 is disposed in the throat 20. The actuator 14 includes an actuator casing 24 having an upper portion 26 removably attached to a lower portion 28. The actuator 14 also includes a diaphragm 30 disposed between and separating the upper and lower portions 26 and 28 of the actuator casing 24, and a control member 32 disposed in the flow path 16. The lower portion 28 of the of the actuator casing 24 is in fluid communication with a downstream control line (not illustrated). Accordingly, a downstream pressure is supplied to the lower portion of the actuator casing 28 and exerts a force against the diaphragm 30.

The control member 32 is configured to reciprocate between an open position and a closed position in response to changes in pressure across the diaphragm 30. In the open position (not illustrated), the control member 32 is spaced apart from the valve seat ring 22, thereby allowing fluid to flow through the throat 20. In the closed position (illustrated in FIG. 1), the control member 32 sealingly engages the valve seat ring 22 to prevent or inhibit fluid from flowing through the throat 20.

The regulator assembly 10 includes a coil spring 34 that biases the control member 32 to the open position. When the outlet pressure of the valve body 12 is low, the coil spring 34 moves the control member 32 to the open position. By contrast, when the outlet pressure of the valve body 12 is high, the pressure exerted against the diaphragm 30 overcomes the biasing force of the coil spring 34, thereby moving the control member 32 to the closed position. Due to this arrangement of the coil spring 34, the regulator 10 is generally classified as a "fail-open" regulator. Other regulators are configured as "fail-closed" regulators, where the spring that biases the control member to the closed position.

As depicted in FIG. 1, conventional regulators typically employ a valve stem 40 to connect the coil spring 34 to the control member 32. A lower end 42 of the valve stem 40 possesses an annular protrusion 44 and a threaded end portion 46. During assembly, the threaded end portion 46 is inserted through a through-hole in the control member 32 such that the control member 32 is positioned between the annular protrusion 44 and the threaded end portion 46. Subsequently, a retaining nut 48 is rotated about the threaded end portion 46 and threadably advanced into contact with a bottom surface 50 of the control member 32. The control member 32 is thereby secured between the annular protrusion 44 and the retaining nut 48.

Conventional control members typically have a bottom surface that is planar across its entire width. Therefore, as depicted in FIG. 2, the retaining nut 48 protrudes outwardly from the bottom surface 50 of the control member 32, and imparts the bottom of the control member 32 with a bulbous profile. Consequently, fluid must flow around the retaining nut 48 during operation. As the control member 32 changes position during operation, the path of the fluid around the retaining nut 48 also changes. As a result, in certain flow conditions, the fluid pressure exerted against the bottom surface 50 of the control member 32 may be less than the fluid pressure exerted against a top surface 52 of the control member 32. In some cases, this pressure differential may cause the control member 32 to settle into a pattern of high frequency oscillations, which in turn, may result in an unstable output pressure of the regulator 10. This phenomenon is more likely to occur in low flow conditions, where any change in the position of the control member 32 can have a large effect on the force balance.

The present disclosure sets forth fluid control devices and methods of assembling such devices embodying advantageous alternatives to existing fluid control devices and existing methods of assembly, and that may address one or more of the challenges or needs mentioned above, as well as provide other benefits and advantages.

SUMMARY

In accordance with a first exemplary aspect, a fluid control device includes a valve body, a valve seat, an actuator casing, a control member, a biasing member, a valve stem, and a connection member. The valve body defines a flow path for a fluid. The valve seat may be disposed in the valve body along the flow path. The actuator casing may be connected to the valve body. The control member may be disposed in the valve body and movable between an open position in which the control member is spaced apart from the valve seat and a closed position in which the control member engages the valve seat. The connection member may be mounted around the valve stem and engaging a bottom surface of the control member. A through-bore may be formed in the bottom surface of the control member and aligned with the longitudinal axis. The through-bore may receive the valve stem. A first counter-bore may be formed in the bottom surface of the control member and aligned with the longitudinal axis. Additionally, the first counter-bore may receive the connection member.

In accordance with a second exemplary aspect, a control member for a gas regulator is provided. The control member may have a valve body defining a flow path for a fluid, a valve seat disposed in the valve body along the flow path, an actuator casing connected to the valve body, a biasing member disposed in the actuator casing and configured to bias the control member to a closed position or an open position, a valve stem connected between the biasing member and the valve seat, and a nut threadably engaging the valve stem. The control member may include a top surface configured to engage the valve seat when the control member is arranged in the closed position, and a bottom surface configured to engage the nut. A through-bore may be formed in the bottom surface of the control member and configured to receive the valve stem. A first counter-bore may be formed in the bottom surface of the control member and configured to receive the nut. Additionally, the first counter-bore may be aligned with the through-bore. Furthermore, a depth of the first counter-bore may be greater than or equal to a thickness of the nut so that the nut does not protrude from the first counter-bore when the nut engages the bottom surface of the control member.

In accordance with a third exemplary aspect, a method of assembling a gas regulator is provided. The method may include: (a) providing a biasing spring, a nut, a valve stem having a threaded end portion, and a control member having a through-bore and a first counter-bore aligned with the through-bore; (b) inserting the valve stem through the biasing spring and through the through-bore of the control member until the threaded end portion of the valve stem is disposed in the first counter-bore of the control member; and (c) rotating the nut about the threaded end portion of the valve stem so that the nut is threadably advanced along the threaded end portion of the valve stem and into engagement with a bottom surface of the control member.

In further accordance with any one or more of the foregoing first, second or third aspects, a fluid control device, a control member, and/or a method of assembling a gas regulator may further include any one or more of the following preferred forms.

In one preferred form, a thickness of the connection member may be less than or equal to a depth of the first counter-bore such that the connection member does not protrude from the first counter-bore.

In one preferred form, the connection member may have a first diameter, and the first counter-bore may have a second diameter, wherein the second diameter is greater than first diameter.

In one preferred form, the through-bore may have a third diameter which is less than the first diameter and the second diameter.

In one preferred form, the bottom surface of the control member may include a second counter-bore aligned with the longitudinal axis, and the second counter-bore may have a fourth diameter which is greater than the second diameter.

In one preferred form, the control member may include a top surface configured to engage the valve seat when the control member is arranged in the closed position.

In one preferred form, a diaphragm may be disposed in the actuator casing and operatively connected to the control member to move the control member in response to changes in an outlet pressure of the fluid control device.

In one preferred form, the connection member may have a threaded inner surface, and the valve stem may have a threaded outer surface, wherein the connection member may be tightened against the bottom surface of the control member by rotating the threaded inner surface of the connection member about the threaded outer surface of the valve stem.

In one preferred form, the biasing member may be configured to bias the control member to the open position.

In one preferred form, the first counter-bore may have a larger diameter than the through-bore.

In one preferred form, a second counter-bore may be formed in the bottom surface such that the first counter-bore is arranged between the through-bore and the second counter-bore, wherein the second counter-bore may have a larger diameter than the first counter-bore.

In one preferred form, the top surface of the control member may be planar.

In one preferred form, the bottom surface may include a first planar section and a second planar section, the first counter-bore may extend between the first planar section and the second planar section, and the first planar section may be configured to engage the nut when the nut is received in the first counter-bore.

In one preferred form, the depth of the first counter-bore may be equal to the thickness of the nut so that an end surface of the nut is level with the second planar section of the bottom surface when the nut is received in the first counter-bore and engages the first planar section of the bottom surface of the control member.

In one preferred form, a depth of the first counter-bore may be greater than or equal to a thickness of the nut so that the nut does not protrude from the first counter-bore when the nut arranged against the bottom surface of the control member.

In one preferred form, the control member may include a second counter-bore aligned with the first counter-bore, wherein the second counter-bore may have a larger diameter than the first counter-bore.

In one preferred form, the bottom surface of the control member may include a first planar section and a second planar section, and the first counter-bore may extend between the first planar section and the second planar section.

In one preferred form, a depth of the first counter-bore may be equal to a thickness of the nut, and wherein rotating the nut about the threaded end portion of the valve stem may comprise threadably advancing the nut along the threaded end portion of the valve stem and into engagement with the first planar section of the bottom surface of the control member, such that an end surface of the nut is level with the second planar section of the bottom surface of the control member.

BRIEF DESCRIPTION OF THE DRAWINGS

It is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION

The present disclosure is generally directed to a control member, as used in fluid control devices (e.g., control valves, regulators, etc.), that provides increased stability, particularly during low fluid flow conditions. The control member includes a recess (e.g., a counter-bore) for receiving a connection member, such as a retaining nut, that couples the control member to a valve stem. By concealing the connection member partially, or completely, in the recess of the control member, the connection member is less likely to influence the fluid flow around the control member. Accordingly, a pressure differential between opposite sides of the control member is less likely to exist, or may even be eliminated. Therefore, as compared to conventional control members, which have an exposed and protruding connection member, the control member of the present disclosure is less likely to settle into a pattern of high frequency oscillations and thereby facilitates a stable output pressure of the fluid control device.

Figure 3:
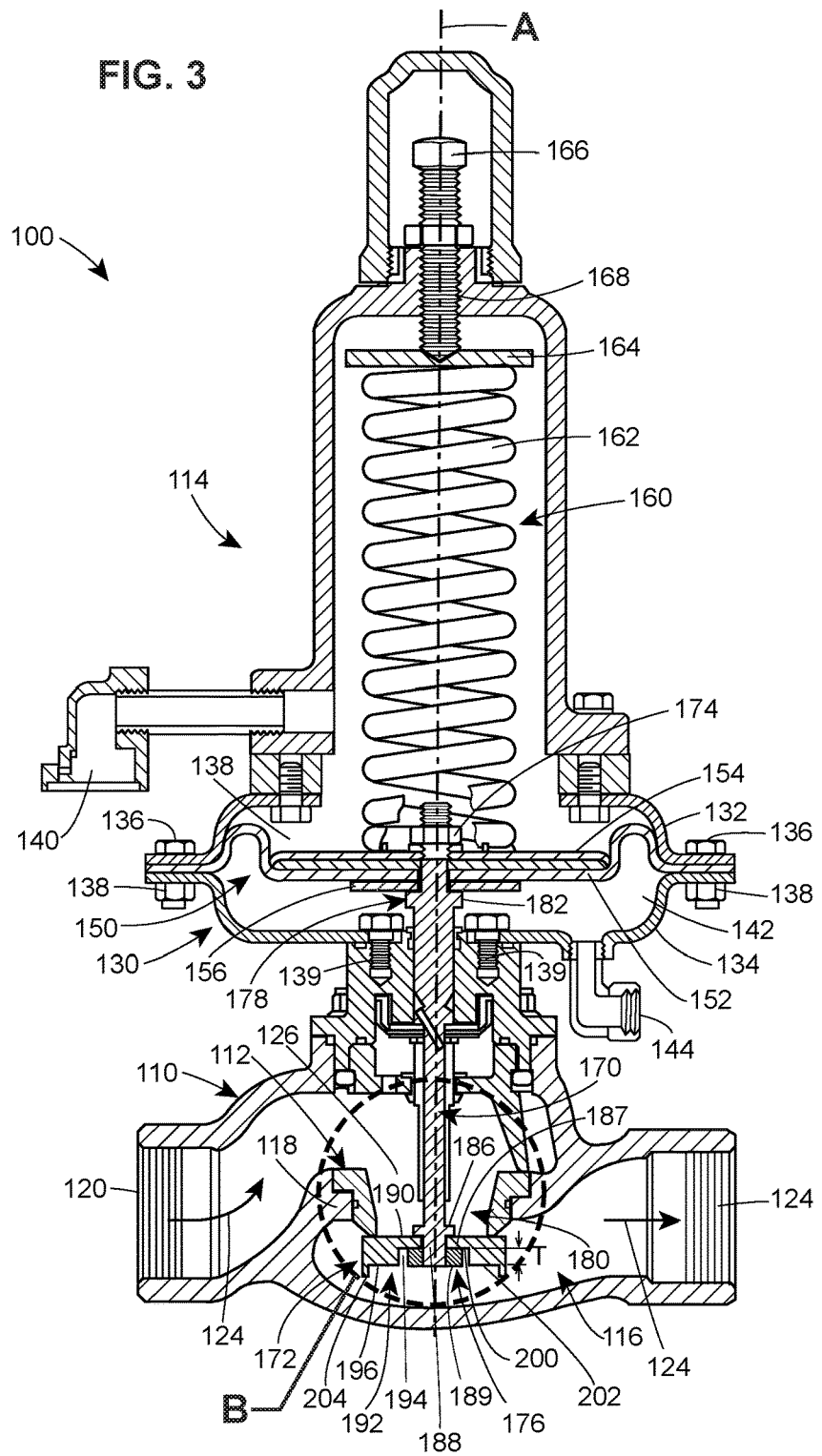
FIG. 3 is a cross-sectional side view of one embodiment of a fluid control device incorporating a control member constructed in accordance with principles of the present disclosure.

With reference to FIGS. 3-11, various embodiments of the present disclosure will now be described. FIG. 3 is a cross-sectional side view of a fluid control device 100 constructed in accordance with principles of the present disclosure. The fluid control device 100 may function as a regulator that reduces a high pressure fluid supply to a usable pressure for an industrial and/or a commercial application, including, for example, a furnace, burner, and/or other appliance. In general, the fluid control device 100 may include a valve body 110, a valve seat ring 112, and an actuator 114. The actuator 114 may include a control assembly 116 moveable between a closed position where the control assembly 116 sealingly engages the valve seat ring 112 (as illustrated in FIG. 3) and an open position where the control assembly 116 is spaced apart from the valve seat ring 112 (not illustrated). As described below in more detail, the control assembly 116 moves in response to changes in pressure downstream of the fluid control device 100.

Still referring to FIG. 3, the valve body 110 includes an inlet 120 and an outlet 122, with a flow path 124 extending between the inlet 120 and the outlet 124. A portion of the flow path 124 is defined by a throat 126 of the valve body 110. The throat 126 may be surrounded by an annular stepped portion 118 of the valve body 110 configured to accommodate and support the valve seat ring 112. In some embodiments, the valve seat ring 112 may have a threaded exterior surface which threadably engages a threaded inner surface (not illustrated) of the annular stepped portion 118. Furthermore, in some embodiments, an o-ring (not illustrated) may be disposed between the valve seat ring 112 and the annular stepped portion 118 to provide a fluid-tight seal therebetween.

In addition to the control assembly 116, the actuator 114 may include an actuator casing 130 having an upper portion 132 and a lower portion 134, as depicted in FIG. 3. The upper and lower portions 132 and 134 of the actuator casing 130 may be removably connected to each other by one or more threaded fasteners 136 and one or more corresponding retaining nut(s) 138. The lower portion 132 of the actuator casing 130 also may be removably attached to the valve body 110 by one or more threaded fasteners 139. The upper portion 132 of the actuator casing 130 may define a cavity 138 for housing a biasing member (discussed below in more detail). The cavity 138 may be vented to the atmosphere through an opening 140 in the wall of the upper portion 132 of the actuator casing 130. The lower portion 134 of the actuator casing 130 may define a cavity 142 for receiving downstream pressure from a conduit or other element (not illustrated) located downstream of, and/or in fluid communication with, the outlet 122 of the valve body 110. The downstream pressure may be supplied to the cavity 142 through a control line (not illustrated) connected to an opening 144 formed in the wall of the lower portion 134 of the actuator casing 130.

Additionally, the actuator 114 may include a diaphragm assembly 150 including at least a flexible diaphragm 152, an upper diaphragm plate 154, and a lower diaphragm plate 156. As illustrated in FIG. 3, a radially inward portion of the flexible diaphragm 152 may be clamped between the upper and lower diaphragm plates 154 and 156, whereas a radially outward portion of the flexible diaphragm 152 may be clamped between the upper and lower portions 132 and 134 of the actuator casing 130. Accordingly, the flexible diaphragm 152 may seal the cavity 138 in upper portion 132 of the actuator casing 130 from the cavity 142 in the lower portion 134 of the actuator casing 130. In some embodiments, the diaphragm 152 may be made of a elastomeric material, or other elastic material.

Still referring to FIG. 3, the actuator 114 may further include a biasing assembly 160 including at least a spring 162, a spring seat 164, and an adjustment screw 166. The spring 162, which functions as a biasing member, may be disposed in the upper portion 132 of the actuator casing 130. In the illustrated embodiment, the spring 162 is a coil spring, however, any other suitable type of spring, or even multiple springs, can be incorporated. The spring 162 is arranged and compressed between the spring seat 164 and the upper diaphragm plate 154. While the upper diaphragm plate 154 of the present embodiment provides a spring seat in the present embodiment, in other embodiments a separate spring seat may be positioned between the lower end of the spring 162 and the upper diaphragm plate 154. The adjustable screw 166 extends through and threadably engages a threaded opening 168 in the wall of the upper portion 132 of the actuator casing 130. The amount of compression of the spring 162, and thus the amount of biasing force provided by the spring 162, is adjusted by threadably advancing the adjustment screw 166 through the threaded opening 168 and against the spring seat 164.

FIG. 3 illustrates that the control assembly 116 may include at least a valve stem 170, a control member 172, a first connection member 174, and a second connection member 176. The valve stem 170 may extend along a longitudinal axis A and possess an upper end 178 and a lower end 180. The upper end 178 of the valve stem 170 may include a first annular protrusion 182 distal to the terminal portion of the upper end 178 and a first threaded end portion 184 proximate to the terminal portion of the upper end 178. During assembly, the upper end 178 of the valve stem 170 may be inserted through a central opening in each of the lower diaphragm plate 156, the flexible diaphragm 152, the upper diaphragm plate 154, so that the first annular protrusion 182 engages a downwardly facing surface of the lower diaphragm plate 156. Subsequently, the first connection member 174, which in the present embodiment takes the form of a retaining nut having a threaded inner surface, may be rotated about the first threaded end portion 184 of the valve stem 170 so that the first connection member 174 is threadably advanced into engagement with an upwardly facing surface of the upper diaphragm plate 154. Securing the first connection member 174 against the upper diaphragm plate 154 may clamp the combination of the flexible diaphragm 152, the upper diaphragm plate 154, and the lower diaphragm plate 156 between the first connection member 174 and the first annular protrusion 182. Also, securing the first connection member 174 against the upper diaphragm plate 154 results in a fixed connection between the upper end 178 of the valve stem 170 and the diaphragm 152, such that the valve stem 170 moves together with the diaphragm 152.

The lower end 180 of the valve stem 170 may include a second annular protrusion 186 distal to the terminal portion of the lower end 180 and a second threaded end portion 188 proximate to the terminal portion of the lower end 180. As discussed below in more detail, the second connection member 176, which in the present embodiment takes the form of a retaining nut having a threaded inner surface, may be rotated about the second threaded end portion 188 to fixedly connect the control member 172 to the lower end 180 of the valve stem 170, between the second annular protrusion 186 and the second connection member 176.

Figure 4:
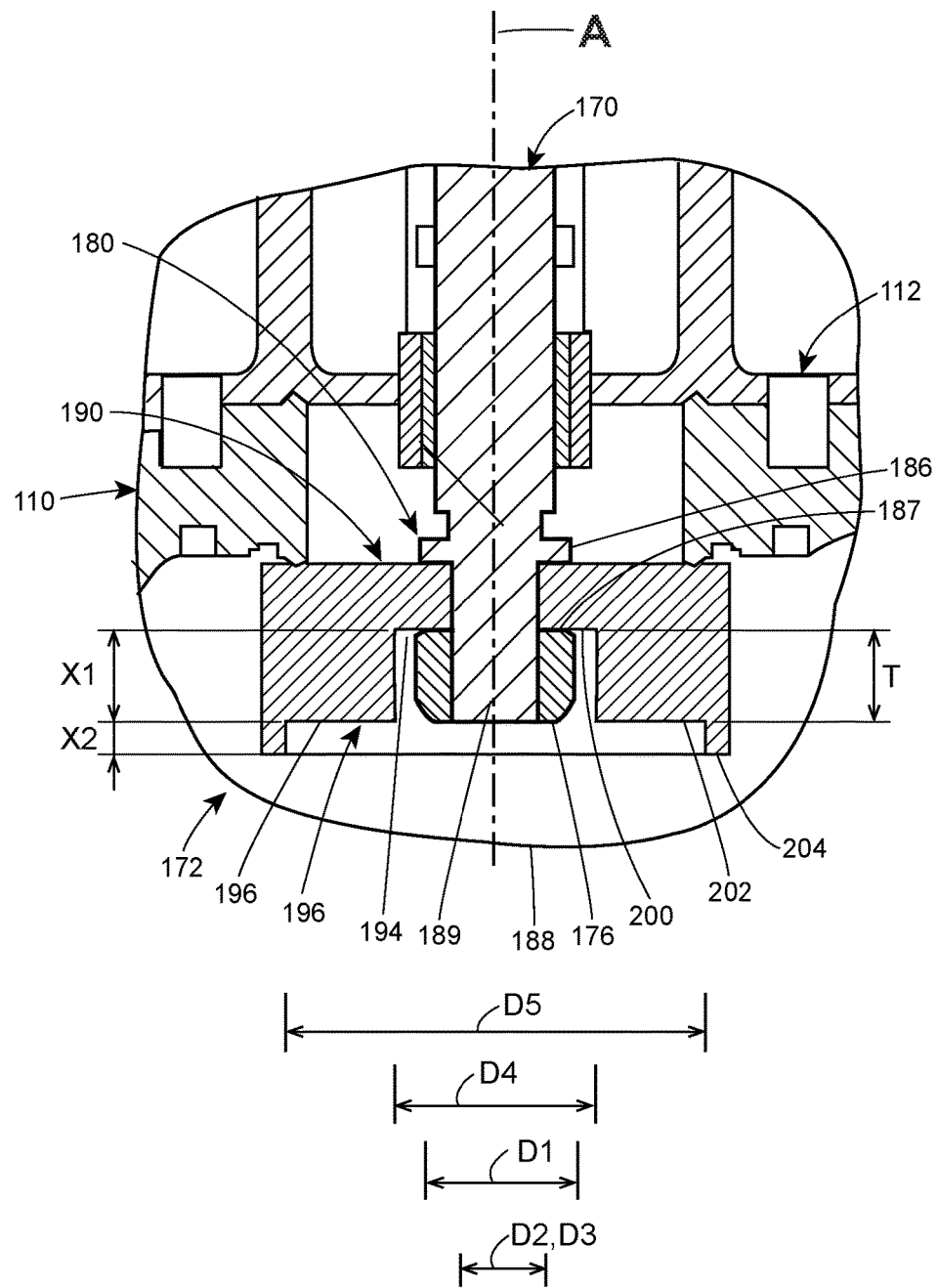
FIG. 4 is an enlarged view of Section B of FIG. 3.
Figure 5:
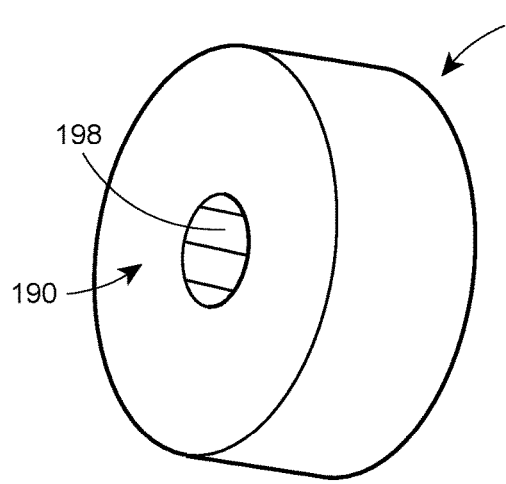
FIG. 5 is a top perspective view of the control member illustrated in FIG. 3.
Figure 6:
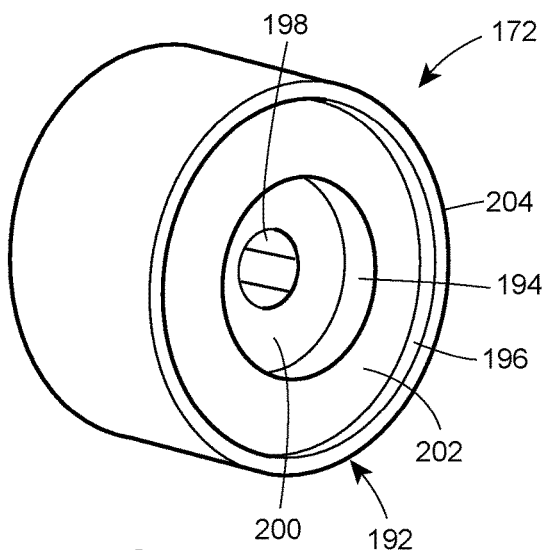
FIG. 6 is a bottom perspective view of the control member depicted in FIG. 3.

As shown in FIGS. 3 and 4, the second connection member 176 may have an outer diameter D1 and a thickness T. The thickness T is the distance between opposite axial end surfaces 187 and 189 of the second connection member 176.

Referring to FIGS. 4-7, the configuration and implementation of one embodiment of the control member 172 will now be described. In general, the control member 172 may function as a valve plug or pad that controls the flow of fluid through the throat 126 of the valve body 110. The control member 172 may include a top surface 190 (i.e., a sealing surface) that faces the valve seat ring 112 and sealingly engages the valve seat ring 112 when the control member 172 is moved by the valve stem 170 to the closed position (see FIG. 3). The top surface 190 may be arranged to face in the upward direction when installed in the fluid control device 100, as shown in FIG. 3. When the valve stem 170 moves the control member 172 to the open position, the top surface 190 may be spaced apart from the valve seat ring 112. In some embodiments, the entirety of the top surface 190 may be planar. In other embodiments, the top surface 190 may have an annular groove (not illustrated) that receives a rim of the valve seat ring 112 when the control member 172 occupies the closed position.

The control member 172 may also have a bottom surface 192 located on a side of the control member 172 opposite to the top surface 190. In some embodiments, the top surface 190 and the bottom surface 192 may be opposite axial end surfaces. As illustrated in FIG. 3, the bottom surface 192 may face downwardly and away from the valve seat ring 112. A first counter-bore 194, a second counter-bore 196, and a through-bore 198 may each be formed in the bottom surface 192. Each of the first counter-bore 194, the second counter-bore 196, and the through-bore 198 may be aligned with the longitudinal axis A of the valve stem 170 when the fluid control device 100 is assembled such that the longitudinal axis A passes through, or passes centrally through, each of the first counter-bore 194, the second counter-bore 196, and the through-bore 198. The first counter-bore 194 may be a first recess or cup formed in the bottom surface 192, and the second counter-bore 196 may be a second recess or cup formed in the bottom surface 192. As illustrated in FIGS. 4-7, the first counter-bore 194 may be arranged between the through-bore 198 and the second counter-bore 196.

The through-bore 198 may extend through the entirety of the control member 172 and thus extend between the bottom surface 192 and the top surface 190. At one end, the through-bore 198 may open into the first counter-bore 194, and at an opposite end, the through-bore 198 may open into the portion of the throat 126 immediately adjacent to the top surface 190 of the control member 172. The through-bore 198 may have an inner diameter D2 which is greater than or equal to an outer diameter D3 of the valve stem 170, so that the valve stem 170 can be inserted through the through-bore 198 during assembly.

Still referring to FIGS. 4-7, the bottom surface 192 may include a first planar section 200, a second planar section 202, and a third planar section 204. Each of the first, second, and third planar sections 200, 202, and 204 may be parallel to each other and spaced apart from each other along the longitudinal axis A, thereby forming a plurality of steps in the bottom surface 192. The first counter-bore 194 may extend between, and have a depth X1 defined as the distance between, the first planar section 200 and the second planar section 202. The second counter-bore 196 may extend between, and have a depth X2 defined as the distance between, the second planar section 202 and the third planar section 204.

The first counter-bore 194 may be sized and dimensioned to receive the second connection member 176. Accordingly, the first counter-bore 194 may have an inner diameter D4 which is greater than or equal to the outer diameter D1 of the second connection member 176. Furthermore, the first counter-bore 194 may have a depth X1 which is greater than or equal to the thickness T of the connection member 176. In an embodiment where the depth X1 of the first counter-bore 194 is equal to the thickness T of the second connection member 176, the axial end surface 189 of the second connection member 176 may be level with the second planar section 202 of the bottom surface 192 of the control member 172 when the axial end surface 187 engages the first planar section 200 of the bottom surface 192 of the control member 172, as illustrated in FIG. 4. Accordingly, the axial end surface 189 of the connection member 176 and the second planar section 202 of the bottom surface 192 of the control member 172 may form a planar or substantially planar surface.

Figure 1:
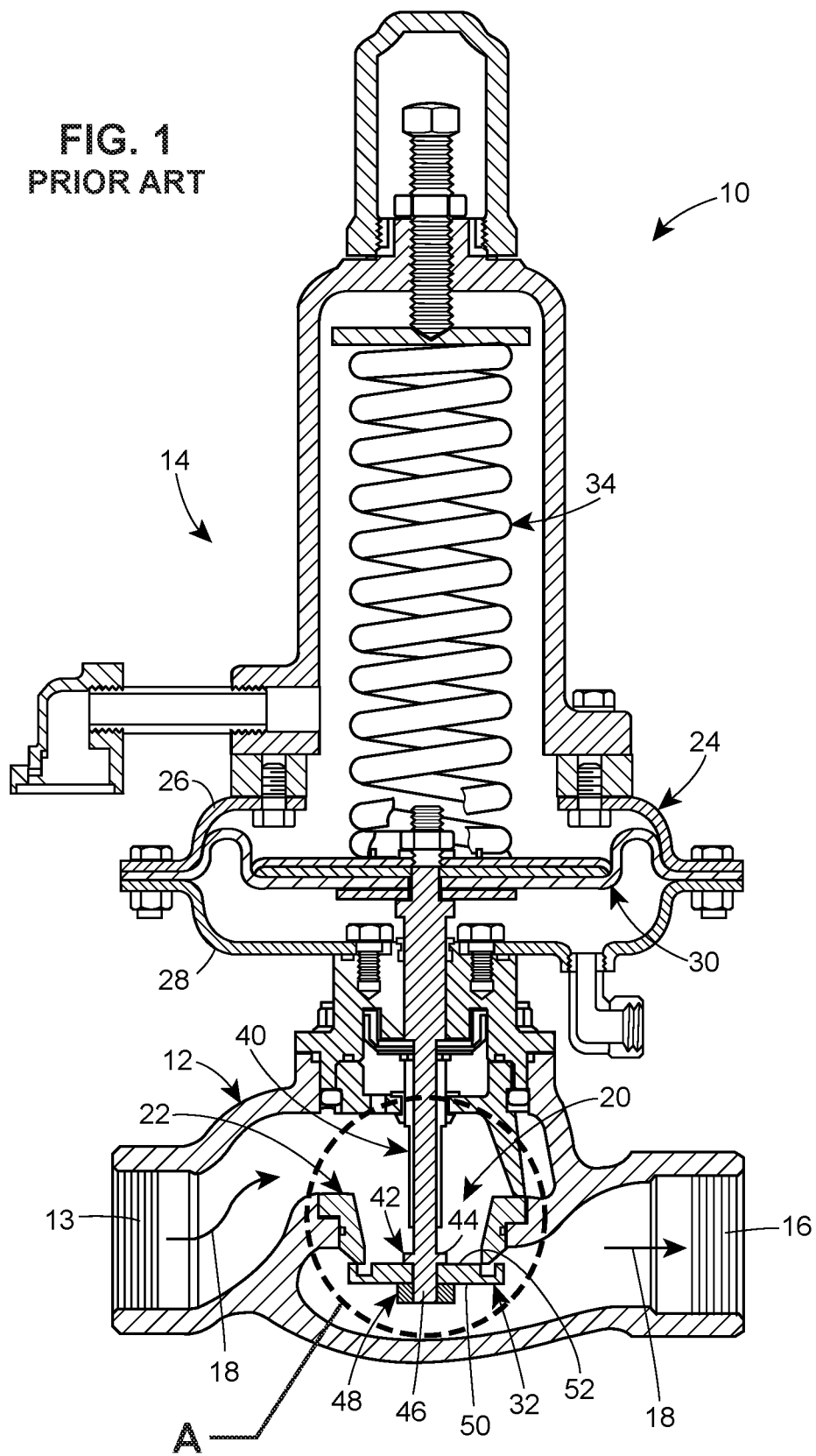
FIG. 1 is a cross-sectional side view of a fluid control device incorporating a conventional fluid control member.
Figure 2:
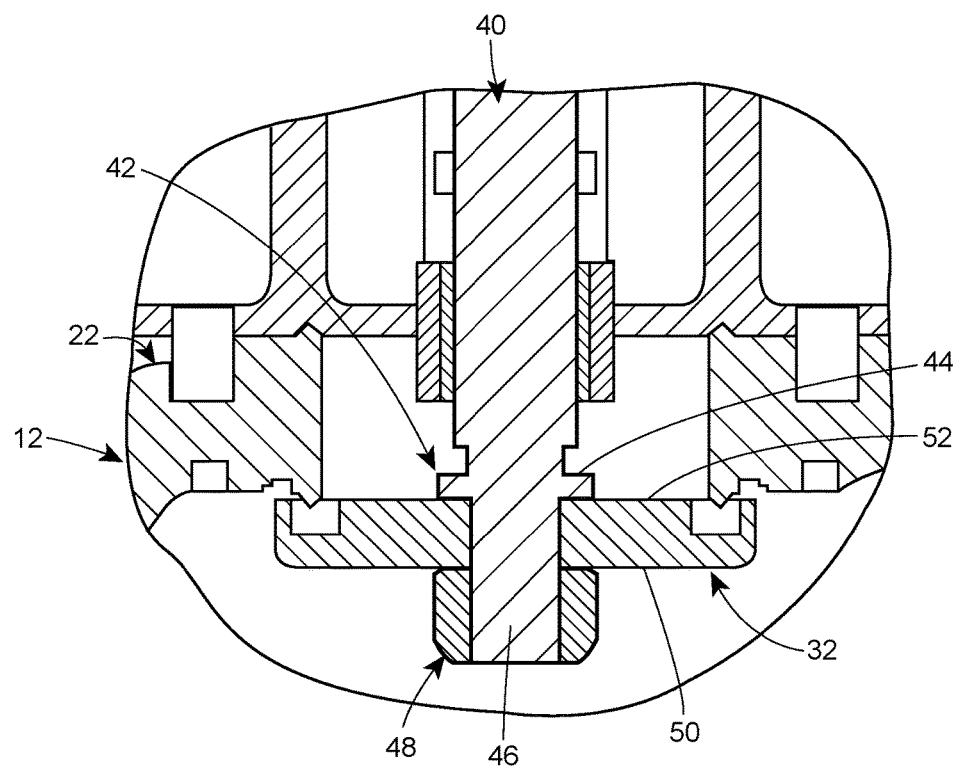
FIG. 2 is an enlarged view of Section A of FIG. 1.

Since the second connection member 176 does not protrude outwardly from the control member 172, the second connection member 176 is less likely to interfere with the flow of fluid around the control member 172 during operation. Accordingly, it is less likely that a difference in fluid pressure will exist between the top surface 190 and the bottom surface 192 of the control member 172. Thus, unlike a conventional control member (see, e.g., the control member 32 of FIG. 1), the control member 172 is unlikely to settle into a pattern of high frequency oscillations or otherwise flutter, at least when the control member 172 initially opens during a low fluid flow operation. The stability of the output pressure of the fluid control device 100 therefore may be improved by the control member 172.

Figure 7:
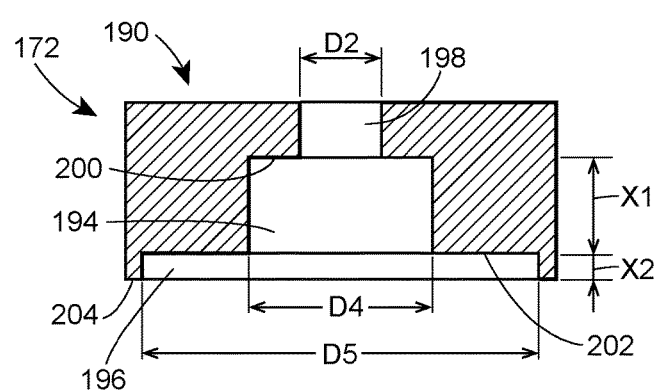
FIG. 7 is a cross-sectional side view of the control member shown in FIG. 3.

Referring to FIG. 7, the second counter-bore 196, which is aligned with the first counter-bore 194, may have an inner diameter D5 which is greater than the inner diameter D4 of the first counter-bore 194. In some embodiments, the depth X2 of the second counter-bore 196 may be less than then depth X1 of first counter-bore 194. The second counter-bore 196 may reduce the pressure drop across the control member 172 and thus reduce the pressure differential between the top surface 190 and the bottom surface 192 of the control member 172. Accordingly, the second counter-bore 196 may further increase the stability of the fluid control device 100.

In the illustrated embodiments, the first counter-bore 194 and the second counter-bore 196, and the through-bore 198 each have a circular cross-section. However, other cross-sections are possible, including a polygonal cross-section, an oval cross-section, or any other suitable cross-section.

During assembly, with the upper portion 132 of the actuator casing 130 removed from the lower portion 134 of the actuator casing 130, the valve stem 170 may be inserted axially through the spring 162, then through the upper diaphragm plate 154, the diaphragm 152, the lower diaphragm plate 152, and finally through the through-bore 198 of the control member 194. As a result, the second threaded end portion 188 of the valve stem 170 is disposed in the first counter-bore 194 of the control member 172. Next, the second connection member 176 may be placed on and rotated about the second threaded end portion 188 of the valve stem 170 so that the second connection member 176 is threadably advanced along the second threaded end portion 188 of the valve stem 170 until the axial end surface 187 of the second connection member 176 engages the first planar section 200 of the bottom surface 192 of the control member 172. In this way, the second connection member 176 may fix the control member 172 to the valve stem 170. As discussed above, since the depth X1 of the first counter-bore 194 is greater than or equal to the thickness of the second connection member 176, the connection member 176 may be concealed within the control member 172, and thus prevented, or at least inhibited, from affecting the fluid flow around the control member 172.

During operation, when there is a decrease in the downstream demand for fluid flow, the fluid pressure in the cavity 142, by way of a control line (not illustrated connected to the opening 144, may increase to enable a slight upward movement of the diaphragm 152. As a result, the control member 172 may move to the closed position where the top surface 190 of the control member 172 sealingly engaging the valve seat ring 112, thereby preventing fluid from flowing through the throat 126. When there is an increase in the downstream demand for fluid flow, the fluid pressure in the control line as well as the fluid pressure in the cavity 142 may decrease to enable a slight downward movement of the diaphragm 152 under the biasing force of the spring 162. Consequently, the control member 172 may move to the open position where the top surface 190 of the control member 172 is spaced apart from the valve seat ring 112, thereby allowing fluid to flow through the throat 126.

While the fluid control device 100 of the present embodiment is disclosed as functioning as a regulator, alternative embodiments can be arranged differently, e.g., with fluid control device 100 being configured as a control valve. Also, while the fluid control device 100 of the present embodiment includes a biasing member that biases the control member to the open position (i.e., a fail-open configuration), alternative embodiments can be arranged with a biasing member that biases the control member to the closed position (i.e., a fail-closed configuration).

With reference to the experimental test data shown in FIGS. 8-11, the performance of a regulator outfitted with a conventional control member, such as the control member 32, will now be compared with the performance of a regulator outfitted with a control member according to the present disclosure, such as the control member 172.

Figure 8:
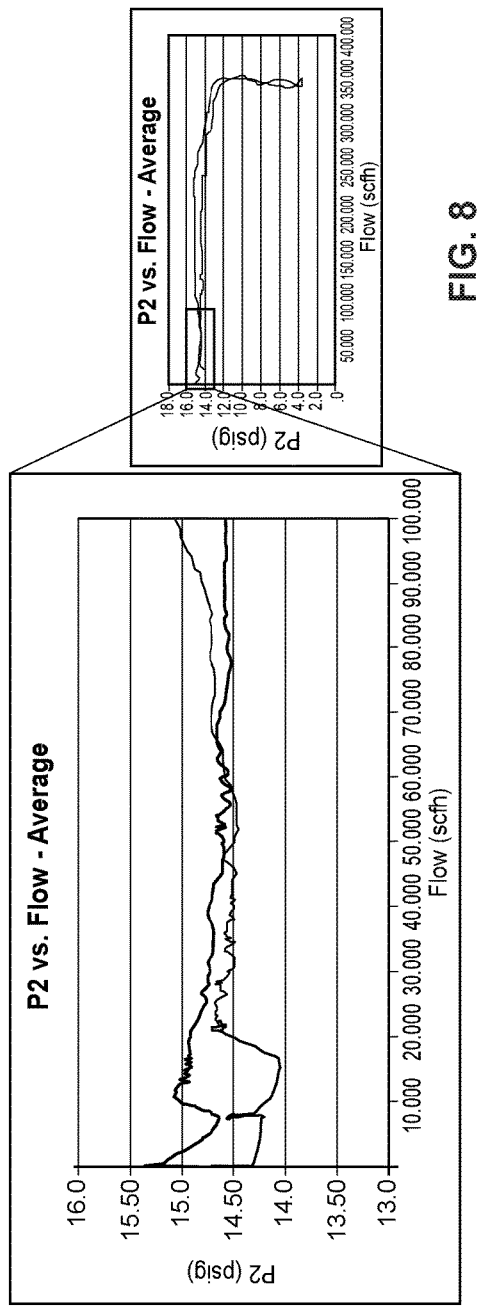
FIG. 8 is a pressure vs. flow graph of a test performed on a regulator outfitted with a conventional control member.
Figure 9:
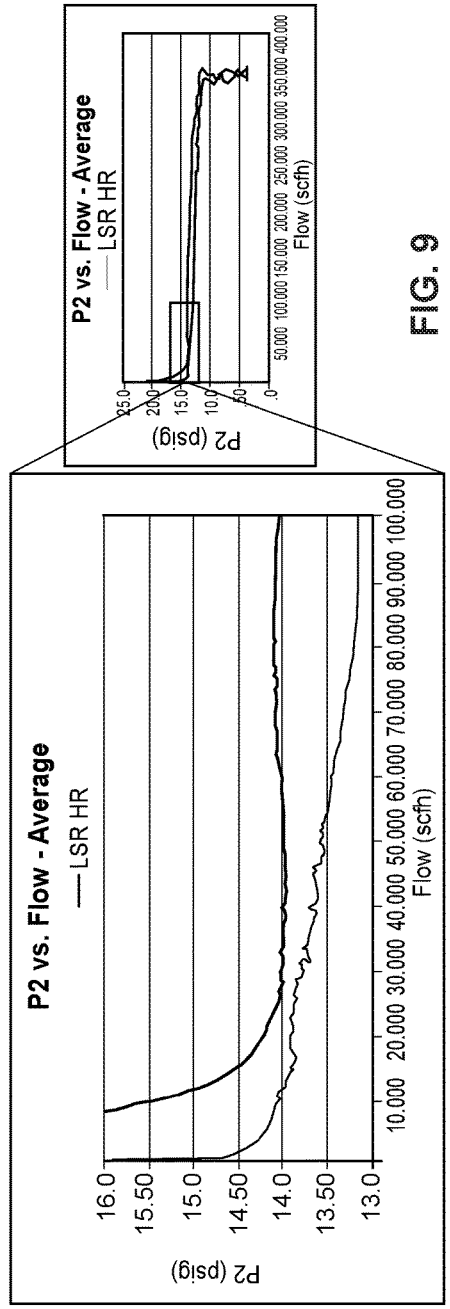
FIG. 9 is a pressure vs. flow graph of a test performed on a regulator outfitted with a control member constructed in accordance with principles of the present disclosure.

FIGS. 8 and 9 illustrate, respectively, a flow curve of a conventional control member and a flow curve of a control member according to the present disclosure. In each of the tests represented by the data shown in FIGS. 8 and 9, the regulator was set with an inlet pressure of 125 pounds per square inch gage (psig) and an outlet pressure of 14 psig. The x-axis of each of the graphs corresponds to the flow rate in standard cubic feet per hour (scfh), and the y-axis of each of the graphs corresponds to the measured outlet pressure P2 in psig. As seen in the FIG. 8 graph, the output pressure of the regulator with the conventional control member is significantly unstable at low flow rates (0-100,000 scfh). By contrast, as seen in the FIG. 9 graph, the output pressure of the regulator with the presently disclosed control member is relatively stable at low flow rates (0-100,000 scfh). This increased stability is an unexpected result of hiding the connection member in the first counter-bore of the control member.

Figure 10:
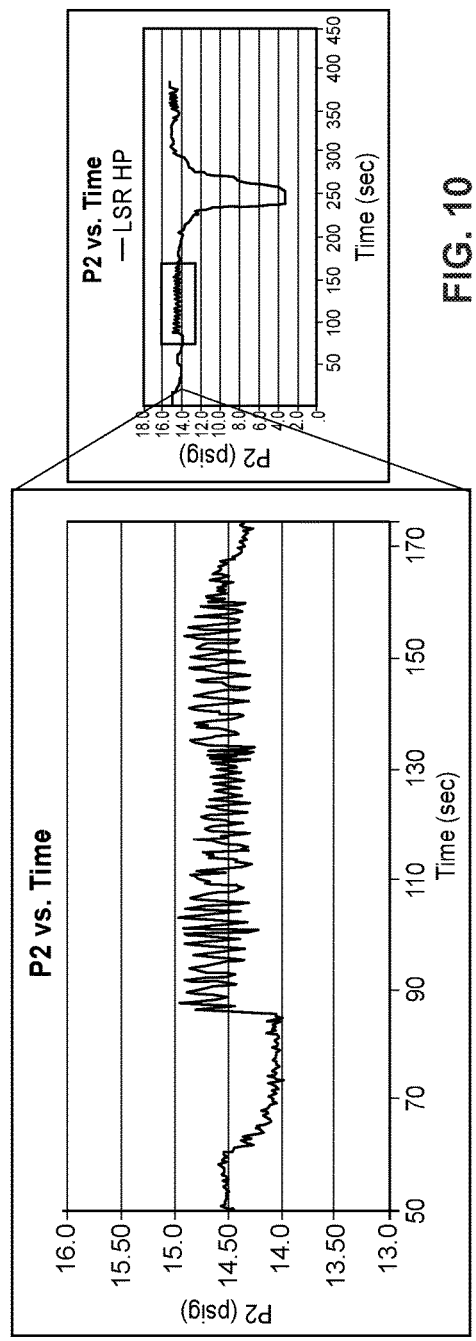
FIG. 10 is a pressure vs. time graph of a test performed on a regulator outfitted with a conventional control member.
Figure 11:
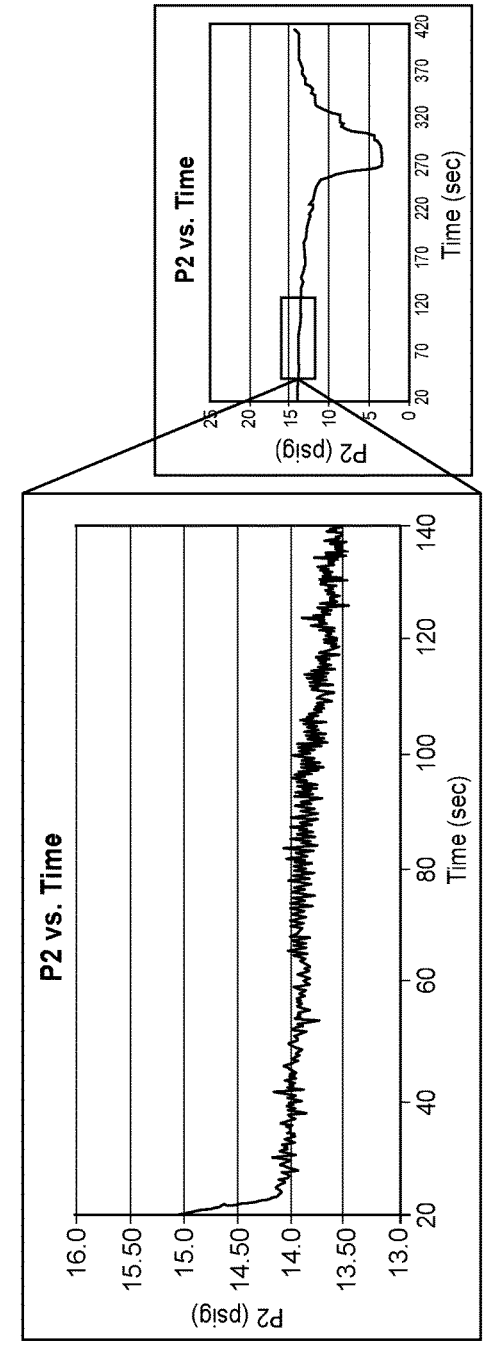
FIG. 11 is a pressure vs. time graph of a test performed on a regulator outfitted with a control member constructed in accordance with principles of the present disclosure.

Looking to FIGS. 10 and 11, illustrated are outlet-pressure vs. time curves corresponding, respectively, to a conventional control member and a control member according to the present disclosure. In each of the tests represented by the data shown in FIGS. 10 and 11, the regulator was set with an inlet pressure of 125 pounds per square inch gage (psig) and an outlet pressure of 14 psig. The x-axis of each of the graphs corresponds to the amount of elapsed time (seconds) following the opening of the regulator, and the y-axis in each of the graphs corresponds to the measured outlet pressure P2 in psig. As seen in the FIG. 10 graph, the output pressure of the regulator with the conventional control member is significantly unstable during the time period shortly after opening the valve (50-170 seconds). By contrast, as seen in the FIG. 11 graph, the output pressure of the regulator with the presently disclosed control member is relatively stable during the same time period. This increased stability is an unexpected result of hiding the connection member in the first counter-bore of the control member.

From the foregoing, it can be seen that the present disclosure advantageously provides an improved control member for a fluid control device that effectively reduces and/or eliminates turbulence caused by a connection member for connecting the control member to a valve stem. This reduction and/or elimination of turbulence advantageously reduces the likelihood of fluttering of the control member, at least during low fluid flow conditions, and therefore increases the stability of the output pressure of the fluid control device.

While the present disclosure has been described with respect to certain embodiments, it will be understood that variations may be made thereto that are still within the scope of the appended claims.

What is claimed is:

1. A fluid control device comprising:
a valve body defining a flow path for a fluid;
a valve seat disposed in the valve body along the flow path;
an actuator casing connected to the valve body;
a control member disposed in the valve body and movable between an open position in which the control member is spaced apart from the valve seat and a closed position in which the control member engages the valve seat;
a biasing member disposed in the actuator casing and configured to bias the control member to the closed position or the open position;

a valve stem connected between the biasing member and the control member and aligned with a longitudinal axis;

a connection member mounted around the valve stem and abutting a bottom surface of the control member to fixedly connect the control member to the valve stem; and a through-bore formed in the bottom surface of the control member and aligned with the longitudinal axis, the through-bore receiving the valve stem;

a first counter-bore formed in the bottom surface of the control member and aligned with the longitudinal axis, the first counter-bore receiving the connection member;

a thickness of the connection member being less than or equal to a depth of the first counter-bore such that the connection member does not protrude from the first counter-bore;

the connection member having a first diameter, the first counter-bore having a second diameter, wherein the second diameter is greater than first diameter;

the through-bore having a third diameter that is less than the first diameter and the second diameter; and wherein the bottom surface of the control member includes a second counter-bore aligned with the longitudinal axis, the second counter-bore having a fourth diameter that is greater than the second diameter.

2. The fluid control device of claim 1, the control member including a top surface configured to engage the valve seat when the control member is arranged in the closed position.

3. The fluid control device of claim 2, comprising a diaphragm disposed in the actuator casing and operatively connected to the control member to move the control member in response to changes in an outlet pressure of the fluid control device.

4. The fluid control device of claim 3, the connection member having a threaded inner surface, the valve stem having a threaded outer surface, wherein the connection member is tightened against the bottom surface of the control member by rotating the threaded inner surface of the connection member about the threaded outer surface of the valve stem.

5. The fluid control device of claim 4, the biasing member configured to bias the control member to the open position.

6. A control member for a gas regulator having a valve body defining a flow path for a fluid, a valve seat disposed in the valve body along the flow path, an actuator casing connected to the valve body, a biasing member disposed in the actuator casing and configured to bias the control member to a closed position or an open position, a valve stem connected between the biasing member and the control member, and a nut threadably engaging the valve stem, the control member comprising:

a top surface having a planar portion configured to engage the valve seat when the control member is arranged in the closed position;

a bottom surface configured to engage the nut;

a through-bore formed in the bottom surface of the control member and configured to receive the valve stem;

a first counter-bore formed in the bottom surface of the control member and configured to receive the nut, the first counter-bore being aligned with the through-bore; and wherein a depth of the first counter-bore is greater than or equal to a thickness of the nut so that the nut does not protrude from the first counter-bore when the nut engages the bottom surface of the first counter-bore; and wherein the first counter-bore has a larger diameter than the through-bore; and further comprising a second counter-bore formed in the bottom surface such that the first counter-bore is arranged between the through-bore and the second counter-bore, wherein the second counter-bore has a larger diameter than the first counter-bore.

7. The control member of claim 6, the bottom surface including a first planar section and a second planar section, the first planar section being configured to engage the nut when the nut is received in the first counter-bore.

8. A method of assembling a gas regulator, the method comprising:

providing a biasing spring, a nut, a valve stem having a threaded end portion, and a control member having a through-bore and a first counter-bore aligned with the through-bore;

inserting the valve stem through the biasing spring and through the through-bore of the control member until the threaded end portion of the valve stem is disposed in the first counter-bore of the control member; and rotating the nut about the threaded end portion of the valve stem so that the nut is threadably advanced along the threaded end portion of the valve stem until the nut abuts a bottom surface of the counter-bore to fixedly connect the control member to the valve stem;

making a depth of the first counter-bore greater than or equal to a thickness of the nut so that the nut does not protrude from the first counter-bore when the nut is arranged against the bottom surface of the counter-bore; and providing the control member with a second counter-bore aligned with the first counter-bore, wherein the second counter-bore has a larger diameter than the first counter-bore.

9. The method of claim 8, including providing the bottom surface of the control member with a first planar section and a second planar section, the first counter-bore extending between the first planar section and the second planar section.

10. The method of claim 9, including forming a depth of the first counter-bore to be equal to a thickness of the nut, and wherein rotating the nut along the threaded end portion of the valve stem and into engagement with the first planar section of the bottom surface of the control member positions an end surface of the nut level with the second planar section of the bottom surface of the control member.

* * * * *